United States Patent
Kvenvold

(10) Patent No.: US 6,570,508 B1
(45) Date of Patent: May 27, 2003

(54) THIN PACK REMOTE ENVIRONMENTAL MONITOR SYSTEM

(76) Inventor: Anthony Mark Kvenvold, 41 S. Shaker Rd., Harvard, MA (US) 01451

( * ) Notice: Subject to any disclaimer, the term of this patent is extended or adjusted under 35 U.S.C. 154(b) by 0 days.

(21) Appl. No.: 09/516,440

(22) Filed: Mar. 1, 2000

(51) Int. Cl.[7] .............................................. G08C 13/00
(52) U.S. Cl. ............................ 340/870.17; 340/870.16
(58) Field of Search ........................ 340/870.11, 601, 340/870.16, 870.17, 588; 374/102, 103

(56) References Cited

U.S. PATENT DOCUMENTS

| | | | | |
|---|---|---|---|---|
| 4,194,179 A | * | 3/1980 | Malinouskas | 128/903 |
| 4,415,896 A | * | 11/1983 | Allgood | 324/127 |
| 4,816,822 A | * | 3/1989 | Vache et al. | 340/601 |
| 4,870,354 A | * | 9/1989 | Davaut | 324/757 |
| 5,313,848 A | * | 5/1994 | Santin et al. | 374/102 |
| 5,748,270 A | * | 5/1998 | Smith | 349/149 |
| 6,160,596 A | * | 12/2000 | Sylvester et al. | 349/61 |
| 6,330,519 B1 | * | 12/2001 | Sawatari | 250/338.1 |

* cited by examiner

Primary Examiner—Michael Horabik
Assistant Examiner—Hung Dang
(74) Attorney, Agent, or Firm—Henry S. Miller

(57) ABSTRACT

A monitor of measurable environmental conditions, contained in a thin, watertight envelope with an electronic processing circuit, liquid crystal display, operating in the positive or negative mode and a two way r/f or infrared spectrum communication system. The monitor collects, stores and provides a readout of the information collected. The processing circuit has a programmable memory and the ability to monitor simultaneously multiple conditions.

18 Claims, 4 Drawing Sheets

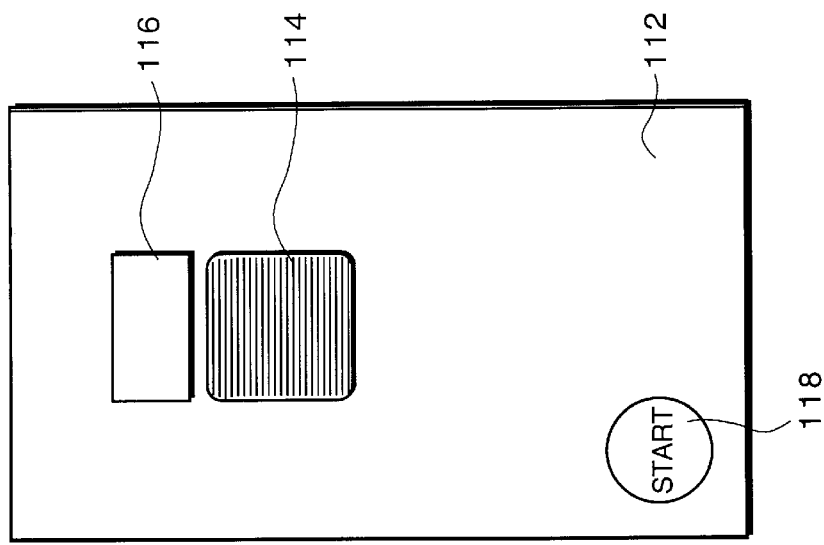
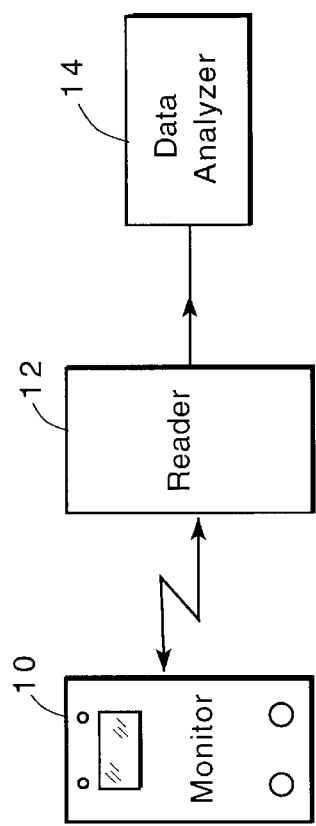
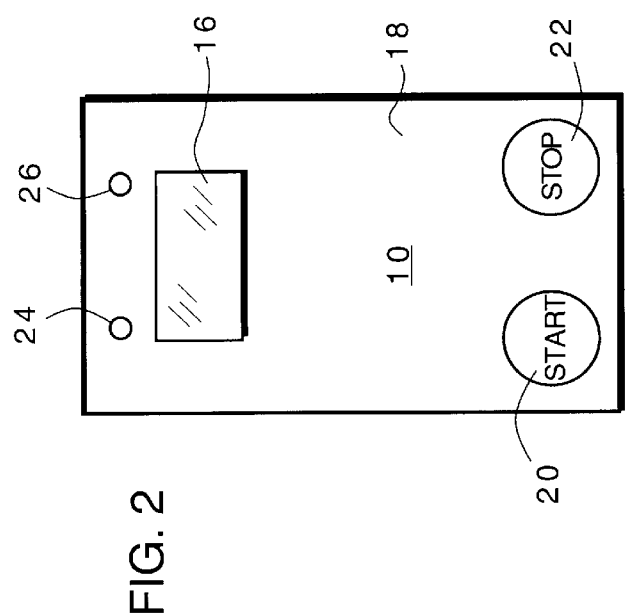

THIN PACK REMOTE ENVIRONMENTAL MONITOR SYSTEM

BACKGROUND OF THE INVENTION

1. Field of the Invention

This invention relates generally to monitoring environmental conditions and more particularly to a device and system that will electronically monitor multiple environmental conditions over a period of time providing a continuous display while storing information for later retrieval.

2. The Problem and Relevant Prior Art

Monitoring of environmental conditions including temperature, atmospheric pressure, humidity, acceleration and other parameters is important in all aspects of everyday life. Packaged goods being one aspect of many where environmental monitoring and control effects us directly. Poor control over the temperature of room environments can seriously and adversely affect the quality of stored or shipped packaged food products and medical products. In other products, temperature extremes will affect the shelf life and usefulness of the product. This, in turn, could affect the health and comfort of the end user of the products.

An important aspect of environmental monitoring of packaged goods is a situation where the same product is shipped in large containers from various locations at the same time to a common distribution point, where packages of goods become commingled. As it now stands the distributor has no way of determining the environmental history of an individual package or an entire Lot once it leaves the shipping container. If the container was environmentally monitored by a conventional large scale monitoring system, information ends once the product is removed from the container. In the case of currently available temperature monitoring systems ambient room or container temperature is measured. These systems lack the ability to measure or record cold or hot areas from within the large area which may cause serious deleterious freeze-thaw affects on the packaged goods.

Packages containing delicate goods may require monitoring for acceleration forces in order to predict damage and prevent the now defective goods from being forwarded to the consumer.

Currently available monitoring-devices and systems are large, expensive and not conveniently disposed of once a shipped product has arrived at its destination. Some monitors are required to be sent back to the point of origin. These monitors are reused many times which raises questions as to calibration and reliability. The cost of monitoring products to the individual level, until now, has never been achieved economically. Presently available electronic monitors have micro devices with programmable read only, memories to store the operating programming of the monitor. This read only memory (ROM) is programmed by blowing fused connections on the micro device. As a result an inherent problem exists when the monitor with this micro is introduced into an electrical field with noise spikes, electrical motive force, or other energy charges. This added energy will tend to temporarily change the state of the ROM causing any number of problems making the monitors unreliable. The problem typically occurs around compressors, electric forklift truck, and motors.

A typical example of such a prior art device is found in U.S. patents, for instance: U.S. Pat. No. 4,816,822 issued Mar. 28, 1989 to Vache et al. for a remote environmental monitor system, and U.S. Pat. No. 5,313,848 issued May 24, 1994 to Santin et al. for a disposable electronic monitor device.

The instant device and system is distinguished from that of Vache et al in that it provides a thin, sealed water proof package that contains programmable electronics and a communication capability via radio frequency or infra red spectrum. In addition, disclosed is a miniature monitor to that is adaptable for use on individual packaged goods which is economically disposable after one use.

Santin et al is distinguished in that the device is of the same class as Vache et al, noted above but fails to provide the improved processing electronics of the device disclosed herein.

The instant invention as disclosed and claimed herein provides distinct and useful advantages not previously known to the prior art.

SUMMARY OF THE INVENTION

The invention in its most simple form consists of an environmental condition monitoring device which, measures and records a selected condition, or multiple selected conditions such as, temperature, pressure, humidity or mechanical shock. The monitoring device simultaneously records time as corresponding to the environmental events otherwise recorded. The information is stored until downloaded by means of a conventional reader which is capable of accessing the monitors memory via an infrared or radio frequency signal. It is anticipated that the environmental condition monitors will be used in multiple units on packaged products hence each monitor is identified by a programmed code. Information gathered by the reader is downloaded to a conventional data analyzing system where the information is decoded and made available for appropriate purposes.

The invention is further characterized by a monitor having a low profile, thin pack design with an LCD display. Included in the monitor is communication circuit and single chip four bit masked microcomputer and a silicon masked read only memory. The invention includes a miniature monitor utilizing a negative mode LCD display that indicates a pass or fail condition for the set purpose of the monitor. It is particularly adapted to be used with individual packaged goods.

It is therefore an object of the invention to provide a new and improved apparatus for monitoring environmental conditions.

It is another object of the invention to provide a new and improved apparatus for monitoring multiple environmental conditions simultaneously.

It is a further object of the invention to provide a new and improved apparatus for monitoring that displays a selected monitored parameter.

It is still another object to provide a new and improved disposable monitor that displays a pass-fail indication relative to a programmed parameter.

It is still a further object to provide a new and improved environmental transducer that is more accurate then any currently available.

It is another object of the invention to provide a new and improved microcomputer processing system for environmental monitors.

It is another object to provide a new and improved processing system for environmental monitors that includes a single chip 4-bit microcomputer.

It is another object to provide a new and improved microcomputer processing system for environmental monitors that is significantly lower in cost than any known and currently available like systems.

These, together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. BRIEF DESCRIPTION OF THE DRAWINGS The invention will be better understood and objects other than those set forth above will become apparent when consideration is given to the following detailed description thereof Such description makes reference to the annexed drawings wherein:

FIG. 1 is block diagram of the system of the invention.

FIG. 2 is a top plan view of a first embodiment of the invention.

FIG. 7 is a top plan view of another embodiment of the invention showing the LCD in negative mode configuration.

DESCRIPTION OF THE PREFERRED EMBODIMENT

Figure 4:
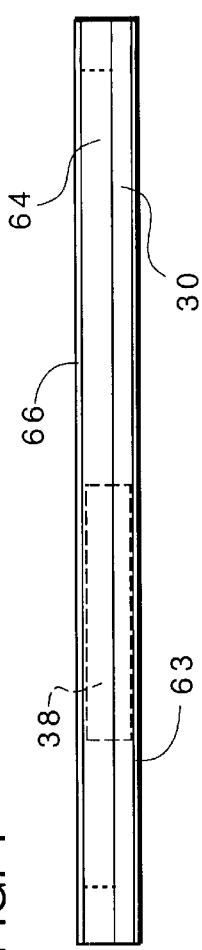
FIG. 4 is side elevation view of the invention showing some interior parts in phantom.

Referring now to FIG. 1, a typical system of the type disclosed consists of a monitor 10, and a compatible readout apparatus 12 connected to a data analyzer 14.

The link between monitor 10 and reader 12 may be in the infra red frequency spectrum or radio-frequency spectrum or a combination of both. Upon command, reader 12 interrogates the monitor 10 and causes its information, collected and stored to download into a memory of the recorder and subsequently the information is sent to data analyzer 14 where it is converted into useful information.

Concerning FIG. 2, the monitor package 10 includes a window 16 for allowing current data to be displayed through the cover of the package 18. Areas on the cover identified by indicia 20, 22 when depressed activate a start switch within the pack and an optional stop switch if used for a particular application. Communications windows 24, 26 in the cover allow the monitor reader to communicate via infrared light with the monitor to program the monitor and download stored data gathered by one or more sensors active in the monitor.

Figure 3A:
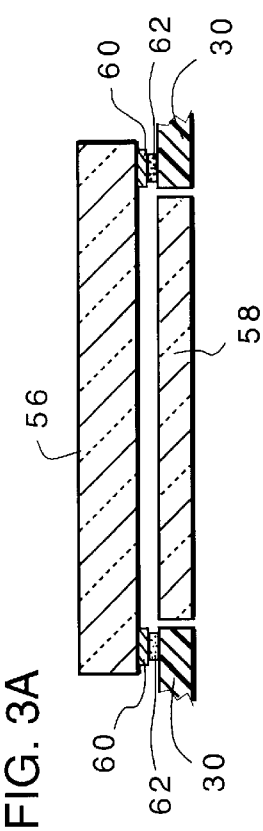
FIG. 3A is a view of the LCD taken along the line 3A—3A.
Figure 3B:
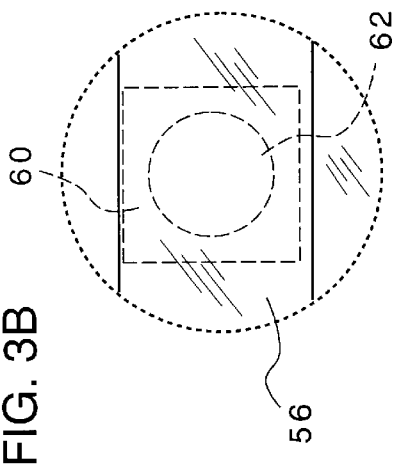
FIG. 3B is an enlarged view of the area of the invention identified as 3B.
Figure 3:
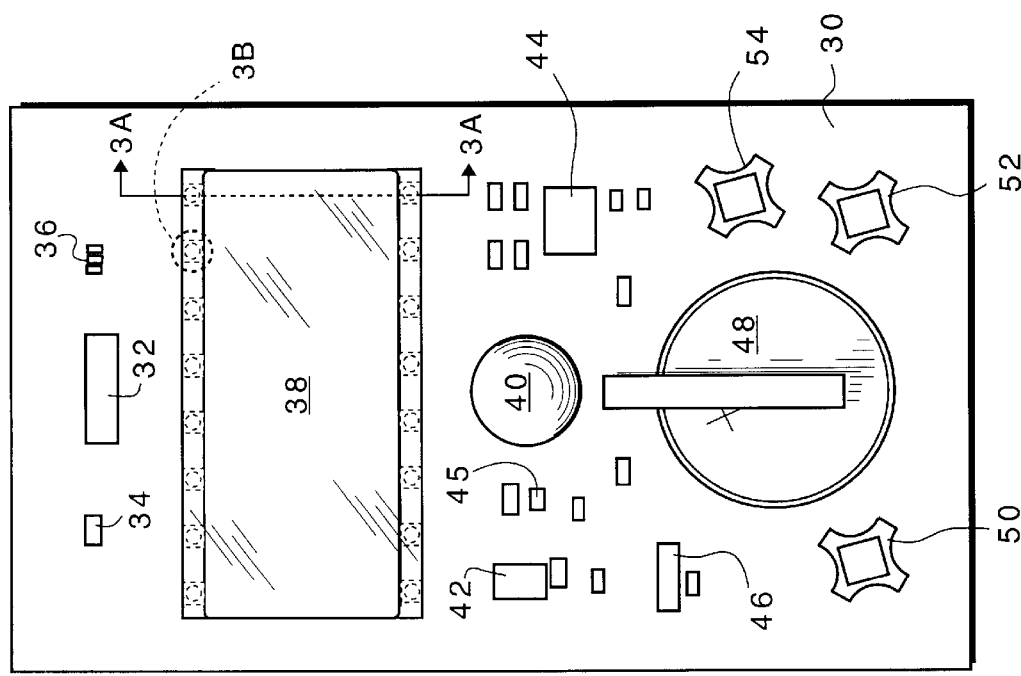
FIG. 3 is a top plan view of the first embodiment of the invention with the cover removed.

FIG. 3 is a top plan view of the invention with the cover removed. A printed circuit board 30 contains all components for the collection, storing and transmission of information to and from the monitor. A radio frequency generator 32 communicates with reader 12 via r/f frequencies. Infrared diode 34 sends data, in the infrared spectrum, in response to infrared signals received by photo transistor 36 from reader 12. A liquid crystal display 38 is mounted in a receiving aperture on the circuit board 30 and cooperatively positioned with the window 16 in the cover whereby displayed information is always accessible.

A masked four bit micro computer 40 operates the monitoring system which will hereinafter be described. An external EE PROM memory 42 is attached to the circuit board as are the fast communication crystal 44 and slow frequency timing crystal 46. Temperature sensing thermistor 45 is affixed directly to the circuit board by means of tape or epoxy. Battery 48 provides 1.5 or 3.0 volts as needed to power the system. Momentary start switch 50 and momentary stop switch 52 if utilized, are mounted on the board in cooperative relation with the printed indicia on the cover 18. An optional reset switch 54 is positioned on the board for a system utilizing the reset feature of the monitor.

Concerning FIGS. 3A and 3B, the liquid crystal display is formed from two sheets of glass 56, 58 with the larger (56) being the viewing side of the display. The smaller sheet (58) being the back. Electrical contact pads 60, adapted to connect to the circuit board, are fixed to the bottom side of the top sheet of glass. Contact pads 60 are made oversize with a minimum of 0.1 inch separation spaces thereby allowing attachment directly to the circuit board 30 with electrically conductive epoxy, or tape 62.

The information may be in positive mode showing the specific value of the data, or in negative mode showing only a pass or fail condition.

"The back of the liquid crystal display 58 fits into a recessed area of the printed circuit board 30 allowing the pads to connect with the circuit board contacts directly and be secured as described, with electrically conductive epoxy or conductive tape 60".

Figure 5:
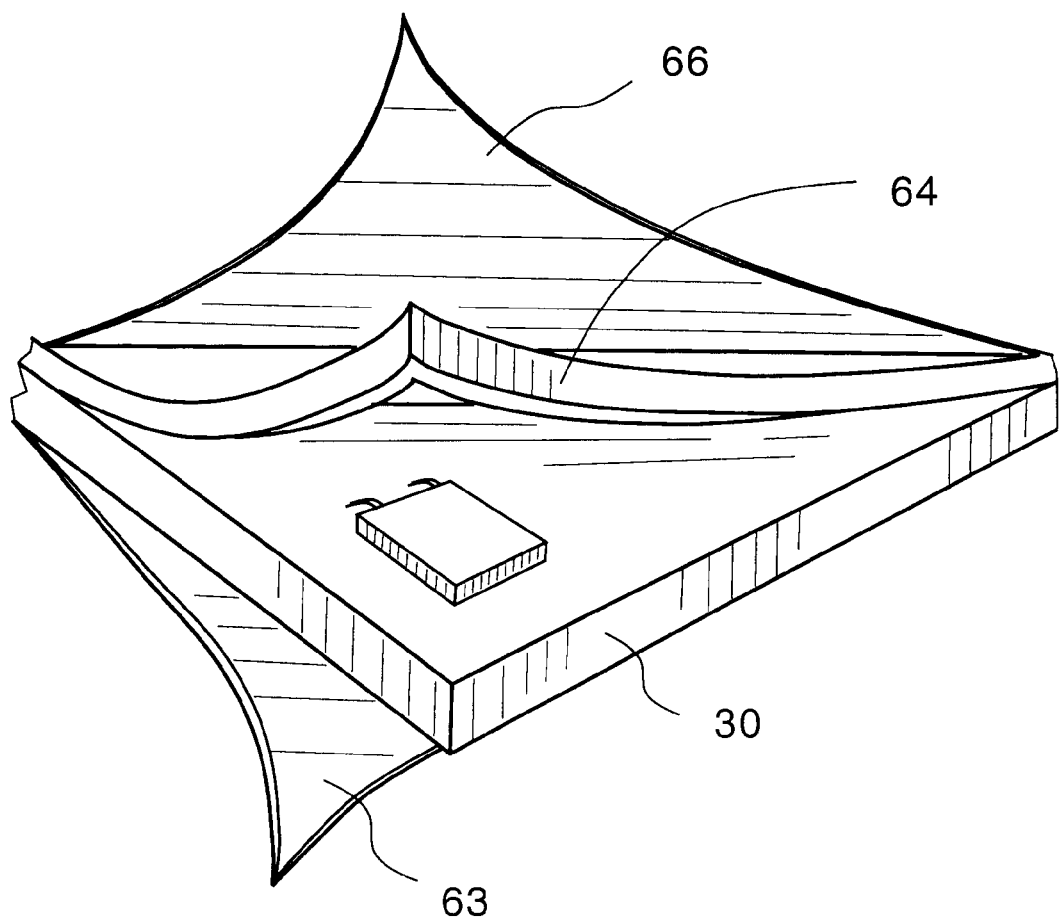
FIG. 5 is a exploded corner view of a monitor showing the placement of relative layers that make up the monitor.

Similarly, referring to FIGS. 4 and 5, the thin package monitor is formed of a printed circuit board assembly 30. Covering the back side is a layer of polycarbonate resin sheet material 63 held in place by an appropriate adhesive material. One or both sides of the sheet material may be coated with adhesive, the surface away from the circuit board for the purpose of securing the monitor to an object to be monitored. Surrounding printed circuit board 30 and following the perimeter is a ring of closed cell foam 64 which is adhesively affixed to the printed circuit board 30. A second sheet of clear polycarbonte resin material 66 is adhesively affixed over the foam ring spacer 64 covering the top side of the printed circuit board 30, completing a water tint seal of the thin pack monitor device. The top sheet may be clear or printed on the backside with ink or color to produce the label and logo needed for the product. The foam spacer in combination with the top sheet material further act as a mechanical stabilizer for parts on the circuit board.

Figure 6:
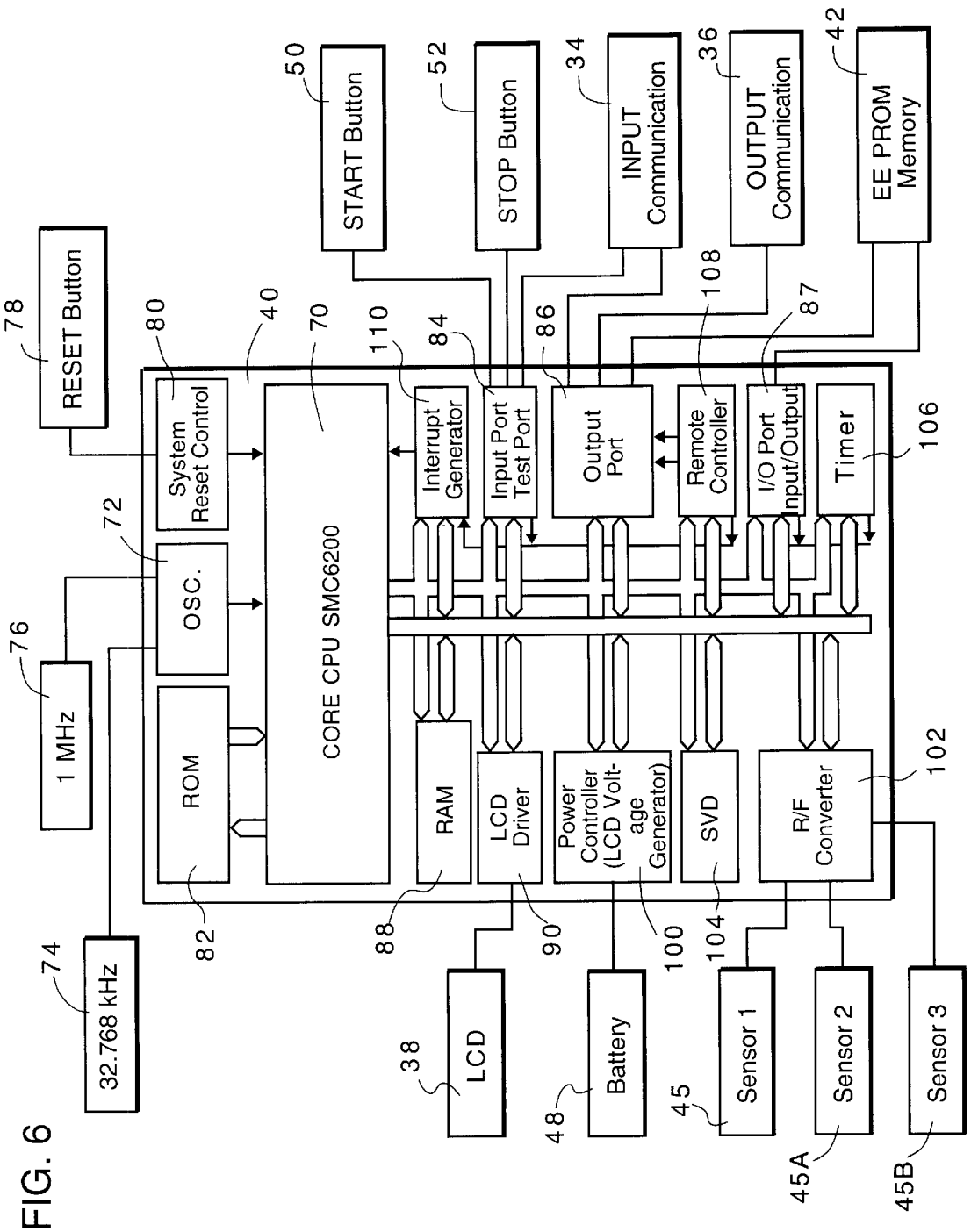
FIG. 6 is a block schematic representation of the system of the invention.

FIG. 6 shows the single chip masked microcomputer 40 utilizing a four bit core central processing unit 70. An oscillator 72 consists of two separate clocks, a 32 KHz crystal 74 for time keeping real time functions including temperature readings and all other normal operations of the monitor. The second clock, a 1 Mhz oscillator, 76 is used for high speed communications only.

An optional reset button 54 activates the system reset control 80 where the monitor is designed to be used more than once.

A silicon masked read only memory 82 is utilized to store the operating programming commands of the monitor. The masked feature eliminates errors created in similar systems when introduced into an electrical field with noise spikes, electrical motive force or other energy sources.

Operation of the monitor is commenced by activation of the start switch 50 at which time the monitor will begin to take readings. It may be terminated at any time by stop switch 52 on monitors so equipped. Monitors not equipped with a stop switch are generally disposable and operate until electrical power in the battery 48 is exhausted. Start and stop switches 50, 52 are connected to the processor via input port 84. Input communication 34 is connected to the processor via input port 84 and output port 86. Output communication 36 is connected to output port 86. Communications input receive all configuration data and commands for the monitor.

Communications output sends information collected and stored in random accessory memory (RAM) 88 and EE PROM memory 42 connected via the input-output port 87 to take sensor readings. It also interrupts the programming when the push buttons are pressed or communications are activated.

Information communicated as input and output may be in the form of infra-red signals or radio frequency signals, or a combination of both.

The liquid crystal diode 38 is operated through the LCD driver 90 and powered by battery 48 via power controller 100.

Sensor 1 which represents a temperature sensing transducer such as thermistor 45 which is surface mounted directly to the circuit board by means of conductive epoxy or conductive tape. This connection effects the sensitivity of the thermistor whereby the rate of change becomes equal to that of the unit. This stabilizes the rate of change, eliminating spikes of temperature and provides an accuracy to within one degree Fahrenheit.

Optional sensors 45A, 45B are connected to the processor through resistance-frequency converter 102. Supply voltage detection system 104 monitors battery voltage and will provide an indication of a low battery condition. The micro computer is set to a desired selected speed by timer 106. The selected speed is a function of the division of the two crystal speeds. Remote controller 108 provides timing for remote control communications. Interrupt generator 110 is set by programming to interrupt the sleep mode of the system and cause it to take sensor readings, check for communications or push on the buttons.

In operation, initial depression of start button 50 and insertion of the monitor into the reader 12 allows for programming of the chip for various parameters not included during the manufacture of the chip 40. This is done through input communication 34 and output communication 36. Initial parameters such as delay start, update rate and reading rate are stored in EE PROM 42.

The monitor is subsequently removed from the reader and placed in its location of operation. For operational purposes the start button is pushed and held for 3 seconds, the monitor becomes activated and a pulsing heart is shown on the LCD 16 to indicate activation and operation. A programmed delay precedes the first reading and storage of other parameters into the EE PROM memory 42.

The monitor continues to operate until the stop button 52 is activated at which time recording of information is terminated.

The downloading of recorded information is accomplished by depressing the start button and inserting the monitor into reader 12 which interfaces with input/output communications port 87 and transfers data to data analyzer 14 for decoding and interpretation.

FIG. 7 is a top view of the low cost, economically disposable embodiment of the monitor shown in FIG. 2. This embodiment 112 includes the same thin pack construction as described hereinbefore. Particular distinguishing features include a start switch 118 only and a negative mode LCD 114. The negative mode liquid crystal provides a pass-fail indication relative to standards programmed into the monitor system. Failure to meet or exceeding the standards will cause the LCD to become black, as will a bad battery power supply. A single input programing window 116 may be relocated for convenience without taking away from the spirit and intent of the invention.

It should be understood, of course, that the foregoing disclosure relates to only a preferred embodiment of the invention and that numerous modifications or alterations may be made therein without departing from the spirit and scope of the invention as set forth in the appended claims.

I claim as my invention:

1. A thin pack remote environmental condition monitor comprising:
   a protective envelope enclosing:
      a printed circuit board having parallel planar surfaces;
      a means for sensing changes in at least one selected environmental condition;
      a monitoring and communication circuit including:
         means for receiving an input signal,
         generating means, connected to said means for sensing changes in at least one selected environmental condition, for generating a signal representative of changes in the selected environmental condition over a time period, said generating means comprising a resistance to frequency converter,
         means for processing and storing signal data associated with changes in the selected environmental condition,
         means for communicating an output signal of processed stored data to means compatible for reading said data, in response to an input signal,
         a power supply means operatively connected to the monitoring and communication circuit, and
      means within the protective envelope for displaying selected environmental condition data in a positive display mode.

2. An environmental condition monitor according to claim 1 wherein: the protective envelope includes first and second sheets of plastic material enclosing the contents of the envelope.

3. An environmental condition monitor according to claim 2 wherein: the firs said sheet is adhesively fixed to one side of the printed circuit board.

4. An environmental condition monitor according to claim 3 further including: a spacer ring of closed cell foam, following the perimeter edge of the printed circuit board and adhesively fixed thereto.

5. An environmental condition monitor according to claim 4 wherein: the said second sheet of plastic material is adhesively fixed to the spacer ring, thereby covering, in a spaced relation; the opposed side of the circuit board.

6. An environmental condition monitor according to claim 5 wherein: the plastic sheet material is polycarbonite resin.

7. An environmental condition monitor according to claim 6 wherein: the means for sensing changes in an environmental condition is a thermistor.

8. An environmental condition monitor according to claim 7 wherein: the sensing thermistor is attached to the printed circuit board.

9. An environmental condition monitor according to claim 1 wherein: the means for processing and storing signal data is a four bit microcomputer.

10. An environmental condition monitor according to claim 9 wherein the means for processing and storing signal is of masked construction.

11. An environmental condition monitor according to claim 1 further including: means for receiving an input signal and means for communicating an output signal.

12. An environmental condition monitor according to claim 11 wherein: the communicated signals are in the radio-frequency range.

13. An environmental condition monitor according to claim 11 wherein: the communicated signals are in the infrared spectrum range.

14. An environmental condition monitor according to claim 1 wherein: means for displaying data is a liquid crystal display mounted within a recess, in the printed circuit board.

15. An environmental condition monitor according to claim 14 wherein: the liquid crystal display is connected to the circuit board by means of conductive pads and affixed by means chosen from the group consisting of conductive epoxy and conductive tape.

16. An environmental condition monitor according to claim 1 further comprising:
- a plurality of oscillation circuits,
- a microcontroller,
- a sensor having a variable resistance connected to said microcontroller,
- wherein said microcontroller comprises:
  - means to convert the sensor resistance to a frequency,
  - means to compare the sensor frequency to a reference frequency, and
  - means to convert the ratio of the reference frequency to the sensor frequency to adjust for errors in said oscillation circuits.

17. A thin pack remote environmental condition monitor comprising:
- a protective envelope enclosing:
  - a printed circuit board having parallel planar surfaces;
  - a means for sensing changes in at least one selected environmental condition;
  - a monitoring and communication circuit including:
    - means for receiving an input signal,
    - generating means, connected to said means for sensing changes in at least one selected environmental condition, for generating a signal representative of changes in the selected environmental condition over a time period, said generating means comprising a resistance to frequency converter,
    - means for processing and storing signal data associated with changes in the selected environmental condition,
    - means for communicating an output signal of processed stored data to means compatible for reading said data, in response to an input signal,
  - a power supply means operatively connected to the monitoring and communication circuit,
  - means within the protective envelope for displaying selected environmental condition data, and
  - a primary sensor remote from said protective envelope but operatively connected to said means for sensing changes in at least one selected environmental condition, wherein said protective envelope is adapted to being affixed to the outside of a package and said primary sensor is adapted to be located inside said package.

18. A system and method of using a plurality of environmental sensors according to claim 17 to monitor the environmental condition of a plurality of items having packaging, comprising the steps of:
- providing each of a plurality of said monitors with identifying programmed code,
- affixing one of said protective envelopes with its enclosed elements to the outside of the packaging of each of said items,
- enclosing the primary sensor of each of said monitors within said packaging,
- activating each of said monitors at a respective first time, and
- reading said data at least one respective further time.

* * * * *